US007433185B1

(12) United States Patent  (10) Patent No.: US 7,433,185 B1
Curran et al.  (45) Date of Patent: Oct. 7, 2008

(54) INTEGRATED DISPLAY COMPUTER STAND WITH INTEGRATED PERIPHERALS

(75) Inventors: Michael A. Curran, Westerville, OH (US); Gary A. Peck, Columbus, OH (US)

(73) Assignee: Micro Industries Corporation, Westerville, OH (US)

( * ) Notice: Subject to any disclaimer, the term of this patent is extended or adjusted under 35 U.S.C. 154(b) by 349 days.

(21) Appl. No.: 11/267,490

(22) Filed: Nov. 4, 2005

Related U.S. Application Data

(63) Continuation-in-part of application No. 11/131,052, filed on May 17, 2005, now Pat. No. 7,397,659, which is a continuation-in-part of application No. 10/937,976, filed on Sep. 10, 2004, now Pat. No. 7,072,179.

(51) Int. Cl.
*H05K 5/00* (2006.01)
*H05K 7/00* (2006.01)
*G06F 1/16* (2006.01)

(52) U.S. Cl. .................. 361/686; 361/681; 361/683

(58) Field of Classification Search .............. 361/681, 361/683–686
See application file for complete search history.

(56) References Cited

U.S. PATENT DOCUMENTS

| | | | | |
|---|---|---|---|---|
| 4,723,195 A * | 2/1988 | Mizzi et al. | ............. | 361/729 |
| 4,771,365 A | 9/1988 | Cichocki et al. | ............. | 361/387 |
| 5,243,493 A | 9/1993 | Jeng et al. | ............. | 361/690 |
| D354,949 S * | 1/1995 | Yao | ............. | D14/337 |
| 5,683,070 A | 11/1997 | Seed | ............. | 248/442.2 |
| 5,729,431 A | 3/1998 | Marwah et al. | ............. | 361/687 |
| 5,742,690 A | 4/1998 | Edgar | ............. | 381/24 |
| 5,761,071 A | 6/1998 | Bernstein et al. | ....... | 364/479.07 |
| 5,769,374 A | 6/1998 | Martin et al. | ......... | 248/221.11 |
| 5,781,708 A | 7/1998 | Austin et al. | ............. | 395/106 |
| 5,826,267 A | 10/1998 | McMillan | ............. | 707/9 |
| 5,978,211 A | 11/1999 | Hong | ............. | 361/683 |
| 5,978,225 A * | 11/1999 | Kamphuis | ............. | 361/707 |
| 6,032,918 A | 3/2000 | Cho | ............. | 248/923 |
| 6,042,007 A | 3/2000 | Nugent et al. | ............. | 235/383 |

(Continued)

OTHER PUBLICATIONS

"Management Software for Interactive Terminals—Kiosks—Media Displays," Kudos—Products, 2 pages from website, http://www.kudosdigital.com/products.

(Continued)

*Primary Examiner*—Jayprakash N Gandhi
*Assistant Examiner*—Anthony M Haughton
(74) *Attorney, Agent, or Firm*—Standley Law Group LLP

(57) ABSTRACT

A stand with integrated peripherals for an integrated display computer. The peripherals are enclosed in a stand housing unit. Only the portion of the peripheral or peripheral interface with which a user interacts is accessible through the stand housing unit. The remaining components are hidden within the housing unit. Various types of peripherals such a CD-ROM or DVD drive may be installed in the base of the stand. Other types of peripherals such as a printer may be installed in the tower of the stand. The base and tower may be combined to form a complete stand. Power cords and cables may extend through the back or bottom of the stand and are protected by the stand base. The complete stand, which can accommodate an integrated display computer, gives each integrated display computer a similar, finished appearance regardless of which peripherals, if any, are enclosed in the stand.

14 Claims, 13 Drawing Sheets

U.S. PATENT DOCUMENTS

| | | | | |
|---|---|---|---|---|
| 6,052,279 | A | | 4/2000 | Friend et al. ................. 361/686 |
| 6,078,848 | A | | 6/2000 | Bernstein et al. ............ 700/237 |
| 6,081,422 | A | | 6/2000 | Ganthier et al. ............. 361/686 |
| D428,411 | S | * | 7/2000 | Poole et al. ................. D14/337 |
| 6,086,173 | A | | 7/2000 | Restell ..................... 312/223.3 |
| 6,178,087 | B1 | | 1/2001 | Cho et al. ................... 361/686 |
| 6,181,554 | B1 | | 1/2001 | Cipolla et al. ............... 361/687 |
| 6,241,149 | B1 | | 6/2001 | Baitz et al. ..................... 235/7 |
| 6,275,375 | B1 | | 8/2001 | Nam .......................... 361/682 |
| 6,290,517 | B1 | | 9/2001 | Anderson ................... 439/131 |
| 6,324,056 | B1 | | 11/2001 | Breier et al. ................. 361/687 |
| 6,336,615 | B1 | | 1/2002 | Jeon ....................... 248/220.42 |
| 6,442,018 | B1 | | 8/2002 | Dinkin ....................... 361/683 |
| 6,502,076 | B1 | | 12/2002 | Smith ........................... 705/14 |
| 6,507,352 | B1 | * | 1/2003 | Cohen et al. ................. 715/817 |
| 6,532,152 | B1 | | 3/2003 | White et al. ................. 361/692 |
| 6,590,764 | B2 | | 7/2003 | Silverstein .................. 361/683 |
| 6,682,251 | B1 | | 1/2004 | Chung .......................... 403/71 |
| D486,486 | S | * | 2/2004 | Jobs et al. .................. D14/371 |
| 6,819,550 | B2 | * | 11/2004 | Jobs et al. ................... 361/683 |
| 6,839,227 | B1 | | 1/2005 | Correa ........................ 361/683 |
| 6,839,231 | B2 | | 1/2005 | Fleck et al. ................. 631/687 |
| 7,055,160 | B1 | * | 5/2006 | Tan et al. .................... 720/647 |
| 7,072,179 | B1 | * | 7/2006 | Curran et al. ............... 361/687 |
| 7,136,280 | B2 | * | 11/2006 | Jobs et al. ................... 361/681 |
| 2001/0034664 | A1 | | 10/2001 | Brunson ....................... 705/26 |
| 2003/0048256 | A1 | | 3/2003 | Salmon ....................... 345/168 |
| 2003/0115096 | A1 | | 6/2003 | Reynolds et al. ............... 705/14 |
| 2003/0235029 | A1 | * | 12/2003 | Doherty et al. ............. 361/683 |
| 2004/0184047 | A1 | | 9/2004 | Silverbrook ................ 358/1.8 |
| 2004/0190238 | A1 | | 9/2004 | Hubbard ..................... 361/683 |
| 2005/0219812 | A1 | | 10/2005 | Strobel ........................ 361/687 |
| 2007/0013277 | A1 | * | 1/2007 | Lin et al. .................. 312/223.2 |

OTHER PUBLICATIONS

TouchPoint Solutions, Inc.—Catapult Software, Catapult™, 2 pages from website, http://www.touchpointsolutions.com/site/technology/discover_catapult.html.

"Microspace®-PC from Digital-Logic—the smallest and fanless computer for rough environmental conditions," Digital-Logic AG—Press Release, Nov. 2002, http://digitallogic.presseagentur.com/pr-infos/digitallogic/en/PR11-02.htm.

"Hush Debuts Fanless Pentium 4PC, Sleek-looking desktop keeps its cool quietly.," PC World, Sumner Lemon, IDG News Service, Sep. 23, 2003. http://www.pcworld.com/resource/printable/article/9,aid,112608,00.asp.

"Little PC's—Fanless," Stealth Computer Corporation, http://www.stealthcomputer.com/littlepc_fanless.htm.

Copient Technologies, web page, 1 page, dated Mar. 9, 2005, from http://web.archive.org/web/20030724224421/http://www.copient-tech.com.

Copient Technologies, Products and Services, web page, 2 pages, dated Mar. 9, 2005, from http://web.archive.org/web/20030806105437/www.copienttech.com/pro.

* cited by examiner

FIG-4C SECTION A-A

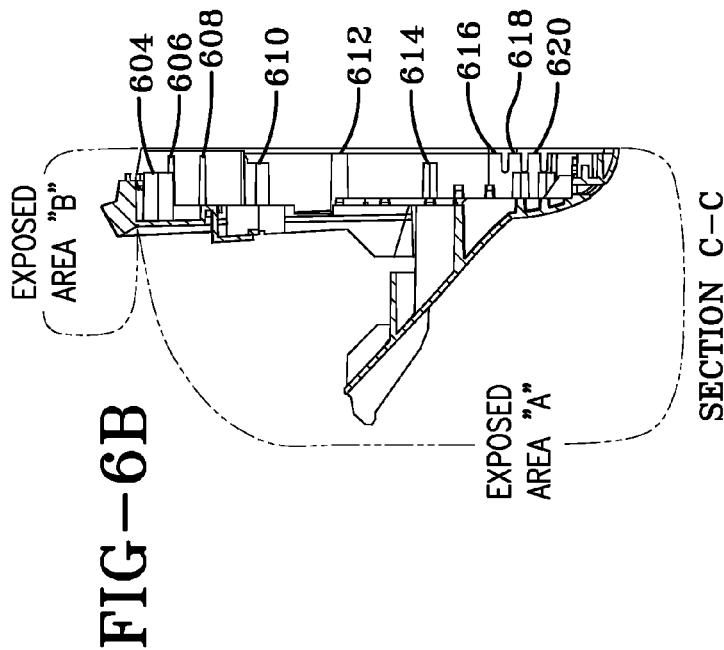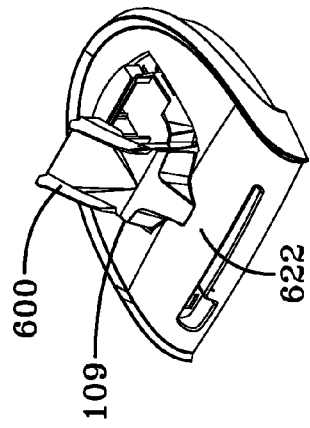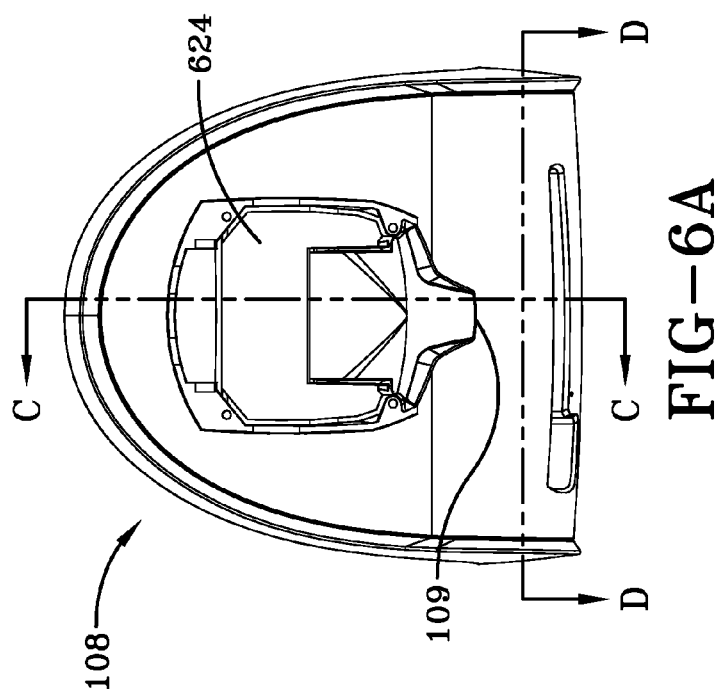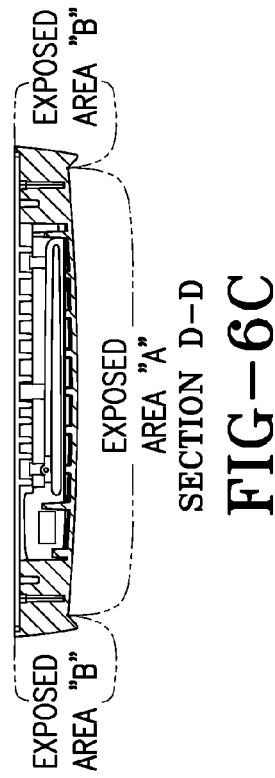

VIEW A-A

VIEW A-A

SECTION B-B

SECTION A-A

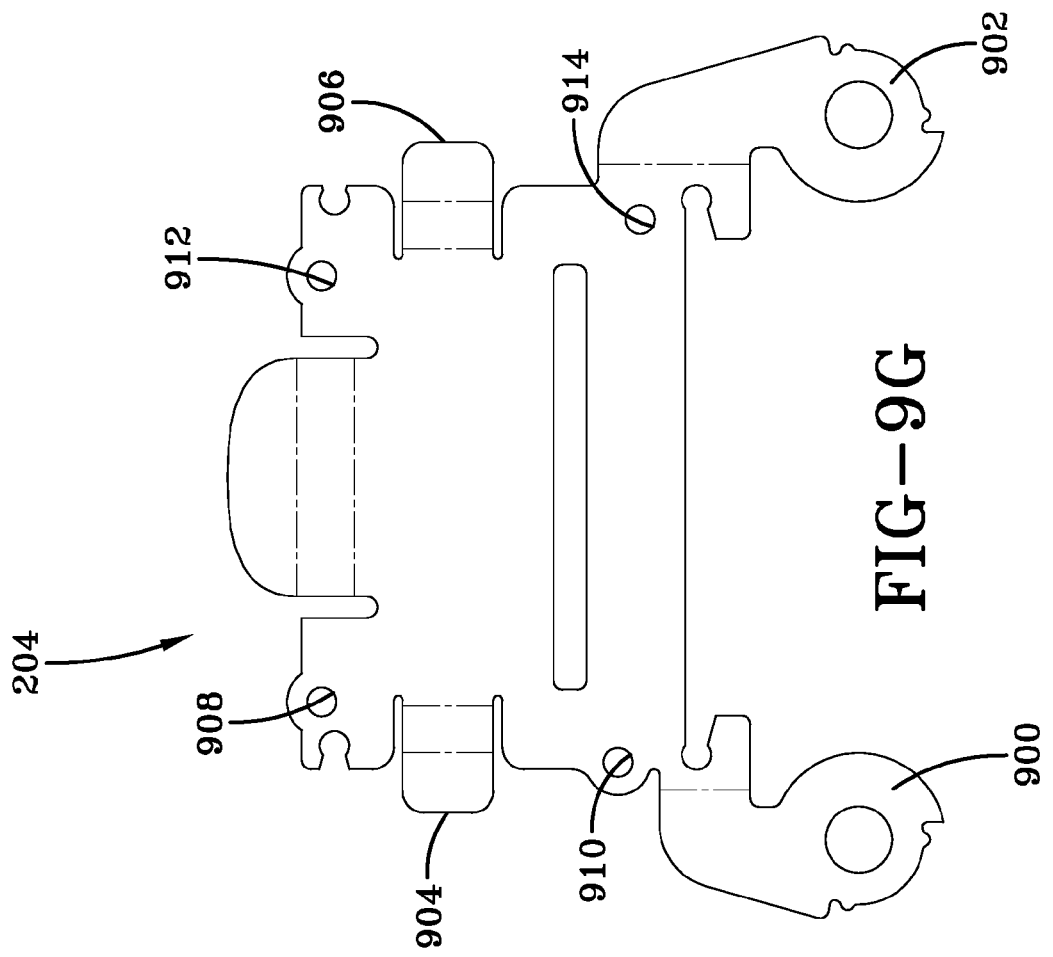
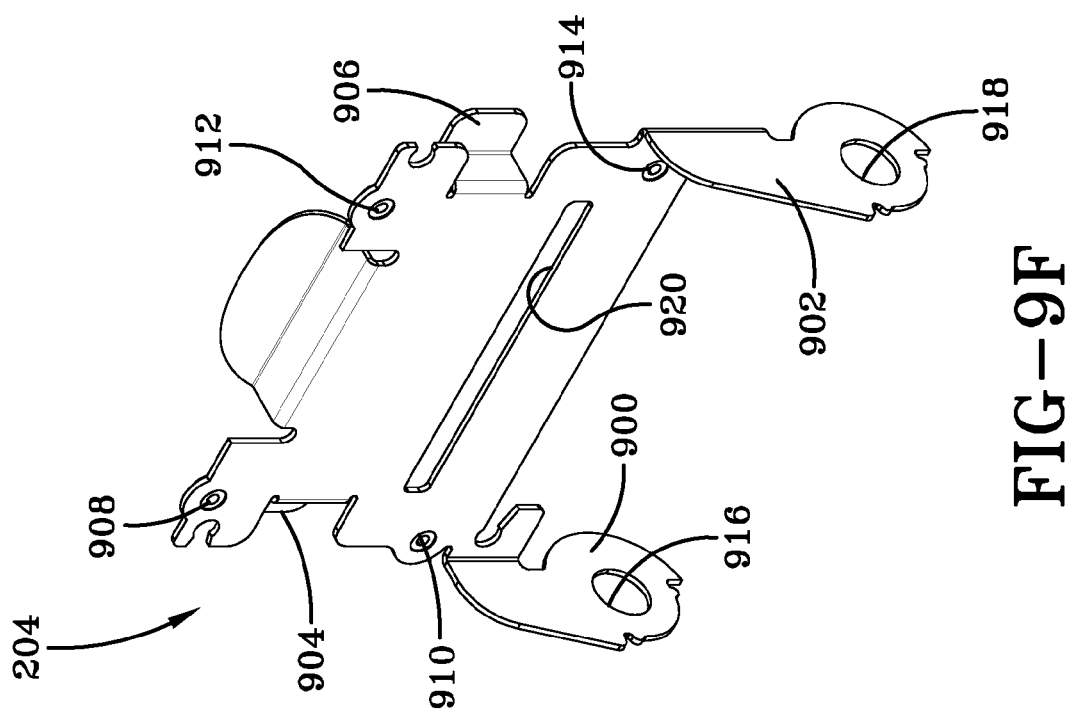

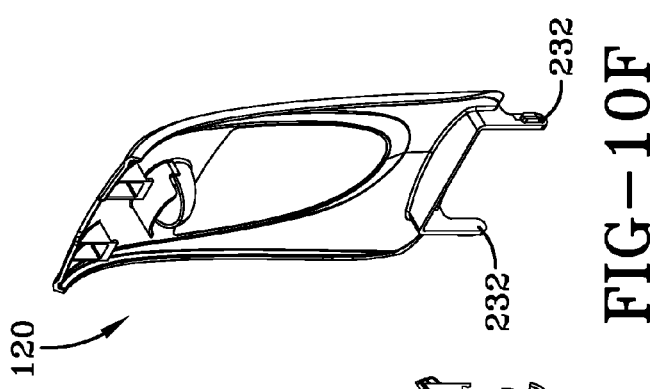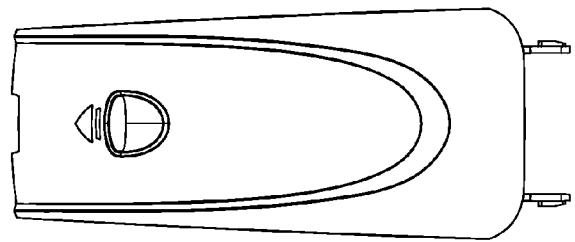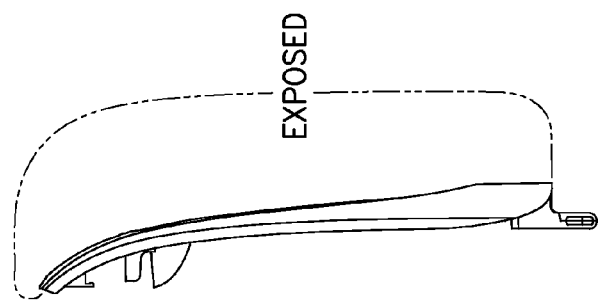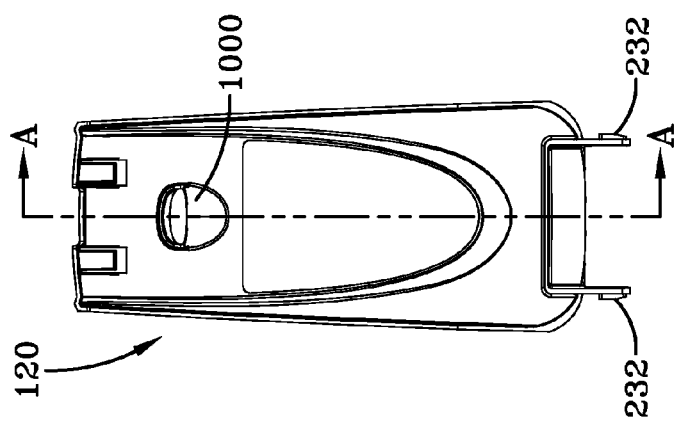

INTEGRATED DISPLAY COMPUTER STAND WITH INTEGRATED PERIPHERALS

CROSS REFERENCES TO RELATED APPLICATIONS

This application is a continuation-in-part application under 37 CFR 1.53(b) of U.S. patent application Ser. No. 11/131,052, entitled Integrated Display Computer with Peripherals filed on May 17, 2005 now U.S. Pat. No. 7,397,659, which is incorporated herein by reference, which is a continuation-in-part application under 37 CFR 1.53(b) of U.S. patent application Ser. No. 10/937,976, entitled Fanless Computer With Integrated Display filed on Sep. 10, 2004, now U.S. Pat. No. 7,072,179 issued on Jul. 4, 2006, which is incorporated herein by reference.

FIELD OF THE INVENTION

The present invention relates generally to integrated computer display stands. More specifically, the present invention is directed to a stand for an integrated display computer that houses peripheral devices such as a printer, CD-ROM or DVD drive, and USB port.

BACKGROUND OF THE INVENTION

Integrated display computers provide basic computer and monitor functionality in a compact package. Although they provide a great deal of functionality in a single package, the functionality is typically limited to the functionality of a simple desktop or tower computer and display unit. Additional functionality, which is often provided by peripherals that are connected to ports on the computer or display unit, is excluded from the integrated display computer because the additional devices increase the size or space needed for the unit so that it is no longer small and compact.

To accommodate the peripherals that some users may need, most integrated display computer manufacturers simply provide ports at various locations on the computer to provide connections for external devices. In some instances, a cable is used to connect the peripheral to the computer. The ports may be exposed or they may have a hinged cover that opens to accommodate the peripheral. While it is possible to attach and detach different peripherals, the connected peripherals require the availability of additional space around the unit to accommodate both the external device and in some cases, a cable. The resulting package is no longer compact. Furthermore, the result can be unsightly as various devices, and possibly cables, surround the integrated display computer. If the ports have covers, the covers are open and the devices or cables extend from the ports. If the ports do not have covers and devices are not attached to the ports, the ports simply remain exposed. The appearance of the integrated display computer may be altered dramatically as peripherals extend from around the computer. If the computer and devices are used in a commercial setting, the combination of components may appear complex and difficult to operate and therefore, unappealing to users.

In addition to changes in appearance, the use of ports and external devices can provide operational challenges. The ports allow devices to be attached and detached very easily. However, the ability to easily attach peripherals means they are subject to inadvertent detachment. If the integrated display computer is in use in a commercial setting, the peripherals may be subjected to heavy and continuous use increasing the likelihood that a peripheral becomes detached. Some users may simply be tempted to purposefully remove a peripheral. Whether peripheral devices are removed accidentally or purposefully, the expense of operating the computer increases due to increased device maintenance and replacement costs.

To increase the functionality of an integrated display computer, a housing unit as described in U.S. patent application Ser. No. 11/131,052, entitled Integrated Display Computer with Peripherals can be used to attach peripherals to either or both sides of an integrated display computer. The housing unit is based on a universal attachment design so that the integrated display computer can accept different types of peripherals. The peripherals are installed in a peripheral housing unit that is attached or affixed to a side of the computer which is designed to accept the housing unit. The housing unit comprises an end cap and a shroud as well as internal components including a mounting bracket that are assembled to complete the unit. The assembled peripheral housing unit is then attached or affixed to the computer. Peripheral-containing housing units may be attached to either or both sides of the computer. In the event only one peripheral is needed or no peripherals are needed, a "blank" housing unit which does not contain a peripheral device may be attached to the computer. The integrated display computer can accept a housing unit on each side regardless of whether it contains a peripheral.

The peripheral housing unit described in U.S. patent application Ser. No. 11/131,052 may further be used with a fanless integrated display computer. One such fanless integrated display computer that is especially well-suited to use for this purpose is described in U.S. patent application Ser. No. 10/937,976, entitled Fanless Computer With Integrated Display, now U.S. Pat. No. 7,072,179 issued on Jul. 4, 2006. The fanless integrated display computer described in U.S. patent application Ser. No. 10/937,976 has several passive cooling design features so that it is fanless and therefore, silent. It comprises a unique heat sink that supports the entire enclosure and causes heat in the device to dissipate through vents. The motherboard assembly attaches directly to the heat sink to facilitate thermal transfer characteristics so that components are cooled without the need for a fan. The heat sink further serves as the entire supporting structure of the circuit board assembly and is designed and incorporated into the device so that any stress experienced by the heat sink is not transferred to the solder joints. The entire PCB assembly, which comprises the processor and chipset, moves with the heat sink.

The benefits provided by a fanless integrated display computer with peripherals include increased reliability and lower maintenance costs. The device never suffers from unreliability or damage due to fan failure. The natural convection process results in very light air inflow and almost completely eliminates internal dust build-up. There is no build-up of dust that is normally caused by the use of fans and that often leads to fan failures. As a result, maintenance costs associated with protecting components from fan failures, repairing and replacing fans, and repairing and replacing components damaged by fan failures are eliminated. Maintenance costs associated with repair and replacement of peripherals devices are also reduced because the peripherals are secured within and protected by the housing unit.

A fanless integrated display computer with peripherals is silent and therefore, suitable for many applications including use in hospitals, libraries, or any other location where the presence of noise and dust is a concern. It comprises an integrated display with peripherals attached to the sides of the display so it is very compact and suitable for use in locations where the availability of space is a concern.

In one application of the fanless integrated display computer, the computer may be mounted on a retail store shelf to provide product information to consumers shopping at a retail establishment. With the multitude of products available to today's consumer, and the wealth of information that now commonly exists with respect to such products, it is desirable for retail establishments to provide the consumer with an on-site and efficient means of accessing this additional information. Retailers can present the consumer with all, or a large portion of, such information at a single source. For example, when considering a foodstuff, typical information may be related to rebate instructions, the existence of coupons, special pricing, or features. The information may also be more product specific, such as the product's nutritional information, for example. Depending on the particular type of products considered and the level of detail desired, the amount of information that may be provided can be substantial. A fanless integrated display computer with a peripheral housing unit comprising a bar code scanner facilitates a consumer's access to product information by allowing the consumer to simply scan the product of interest. The amount of information that may be provided via the computer display is virtually endless.

Although a fanless integrated display computer with peripherals is suitable for many commercial applications because of its reliability and durability, its compact size may not permit it to accommodate all peripherals that may be desired for a commercial application. Size limitations may impact the number of integrated peripherals that can be integrated into the display. Furthermore, some peripherals such as printers and CD-ROM or DVD drives may simply be too large to attach to a side, top, or bottom of an integrated display computer. If the peripheral cannot be attached to the integrated display using a housing such as the one described in U.S. patent application Ser. No. 11/131,052 or if size limitations prohibit integration of needed peripherals into the display, then the prior art method of attaching peripherals using a port, which detracts from the appearance of the integrated display computer and increases maintenance costs, is the only option for increasing the number of peripherals. Therefore, additional methods for integrating peripherals with an integrated display computer are needed.

SUMMARY OF THE INVENTION

The present invention is a stand with integrated peripherals for an integrated display computer. A stand for an integrated display computer that houses peripheral devices such as a printer, CD-ROM or DVD drive, and USB port provides additional functionality for the computer without detracting from the appearance of the unit.

The stand comprises a base and a tower, each of which may house a peripheral device. The complete stand is formed when the base and tower are attached. An integrated display computer may then be attached to the tower to form a complete unit with features and functionality for interacting with the peripherals. Only those portions of the peripherals that a user needs to access are exposed. In certain instances, such as with a printer, the peripheral may be completely inaccessible to a user. Only the paper dispensed by the printer is accessible. The stand therefore, protects the peripherals thereby making the unit attractive and cost effective to maintain.

BRIEF DESCRIPTION OF THE DRAWINGS

FIG. 4C is a sectional side view.

FIG. 6A is a top view, FIG. 6B is a sectional side view, FIG. 6C is a sectional front view, and FIG. 6D is a perspective view of a stand base as shown in FIG. 2A.

FIG. 9F is a perspective view, and FIG. 9G is a view of a print head bracket as shown in FIG. 9D prior to being subjected to a bending operation.

FIG. 10A is a top view, FIG. 10B is a front view, FIG. 10C is a right side view indicating an exposed area, FIG. 10D is a rear view, FIG. 10E is a left side sectional view, and FIG. 10F is a perspective view of a printer bay access door as shown in FIG. 2A.

DESCRIPTION OF EXAMPLE EMBODIMENTS

Figure 1B:
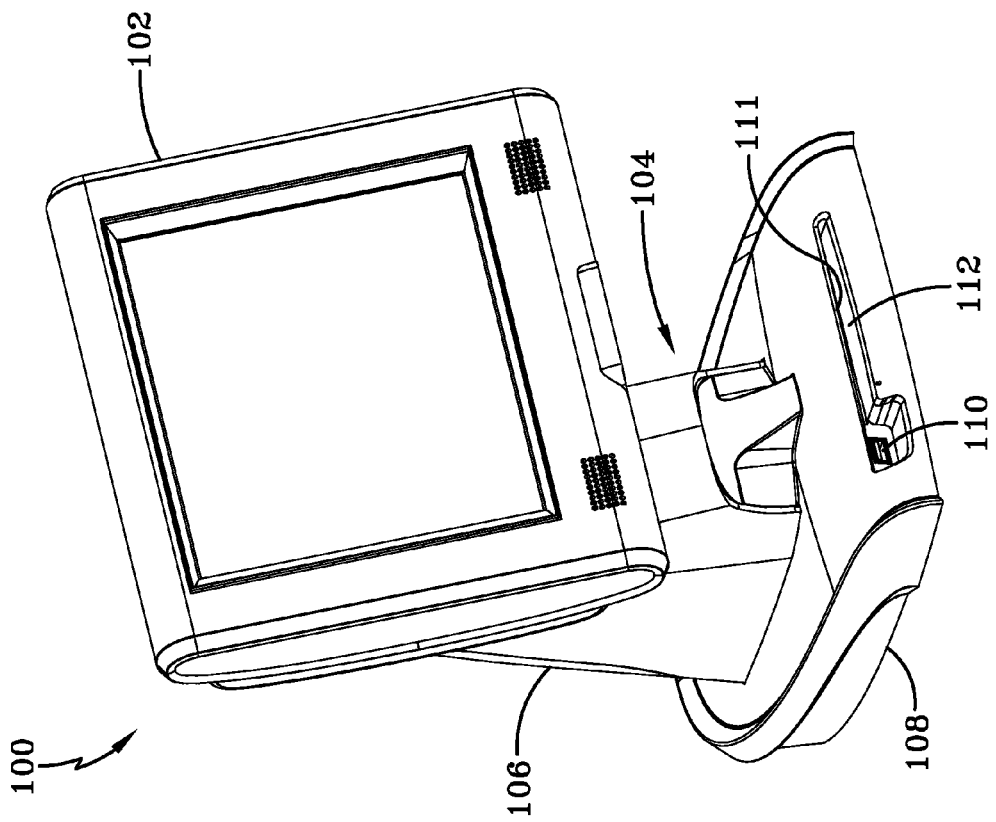
FIG. 1A is a left rear perspective view and FIG. 1B is a left front perspective view of an integrated display computer with a stand with integrated peripherals of the present invention assembled from the components shown in FIGS. 2-10.
Figure 1A:
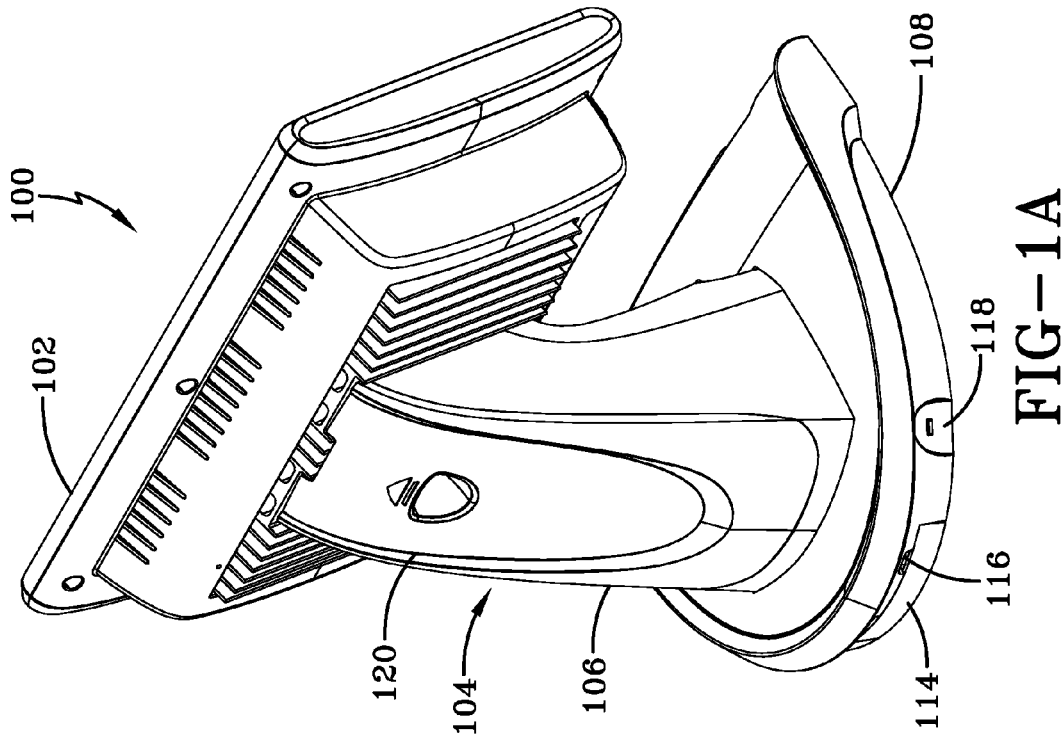

Referring to FIGS. 1A and 1B, rearward and frontward perspective views of an integrated display computer attached to a stand with integrated peripherals for an example embodiment of the present invention are shown. Referring to FIG. 1A, the completed unit 100 comprises an integrated display computer 102 and a stand 104 that houses one or more peripherals. The stand 104 comprises a tower 106 and a base 108, each of which may house a peripheral. For example, as shown in FIG. 1B, a base 108 may comprise a USB port 110 and a CD-ROM drive 112. An opening in the base 111 allows a user to access the housed peripherals. A printer may be housed in the tower 106 which further comprises a printer bay access door 120 for accessing the printer and paper. The printer may be used to print receipts or other information that is then dispensed to a user from the tower. Connectors such as power cords or cables for the integrated display computer or peripherals may extend through an aperture 116 that is created when a base door 114 is installed at the back of the stand base 108. Finally, the stand base 108 may comprise a t-lock or other type of locking slot 118 that comprises a chain or cable to secure the unit to a table, shelf, or other permanent object to discourage theft.

Figure 2A:
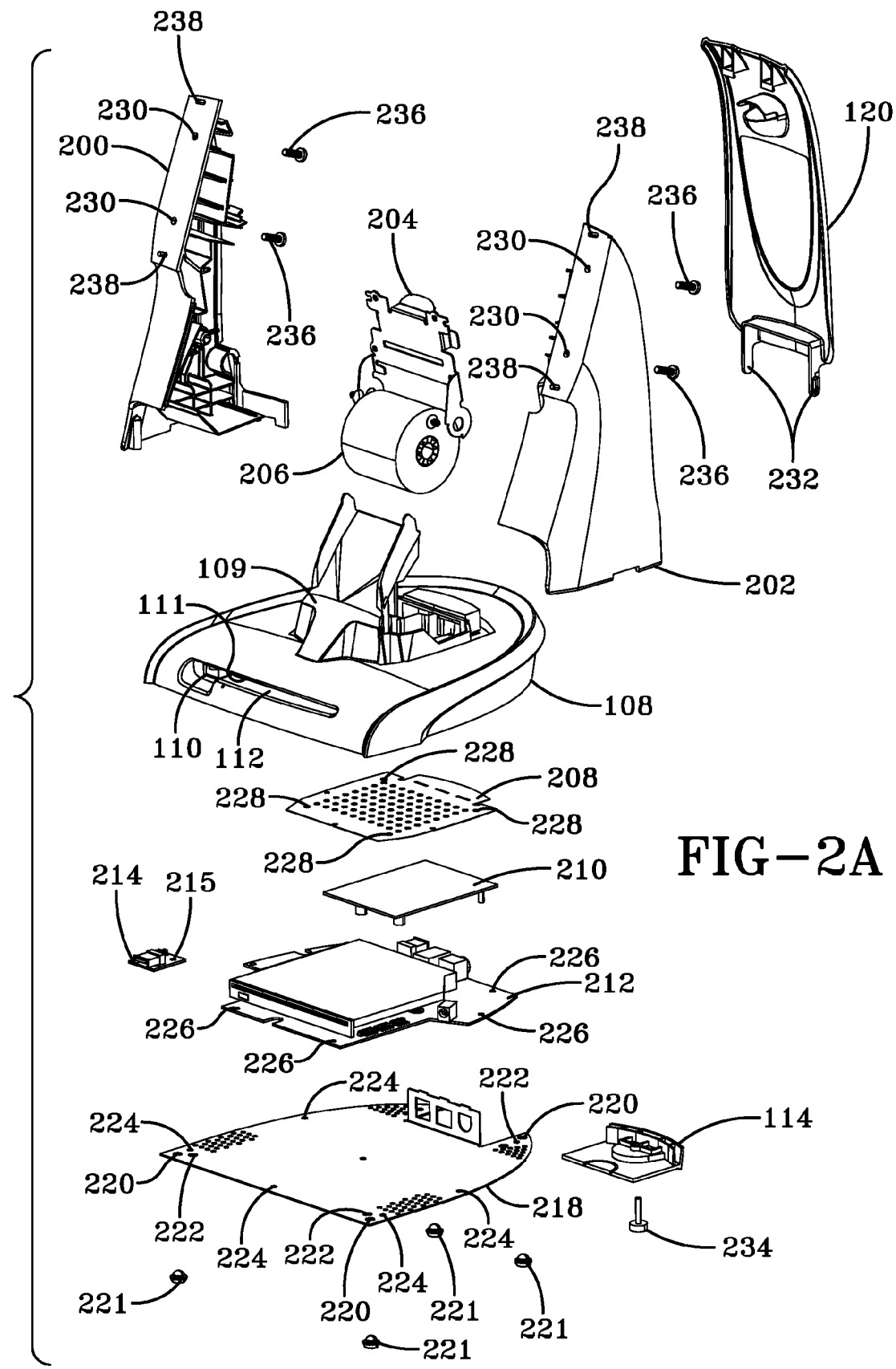
FIG. 2A is an exploded perspective view of a stand with integrated peripherals of an example embodiment of the present invention.

Referring to FIG. 2A, an exploded view of a stand for housing peripherals for an example embodiment of the present invention is shown. The peripheral devices shown for purposes of illustration in the example embodiment of FIG. 2A are a printer, a USB port, and a CD-ROM drive. Alternatively, other types of input/output devices or peripherals, such as bar code scanners or magnetic card readers, may be assembled into the stand of the present invention. Various types of USB peripherals as well as custom peripherals that use a serial port or a custom interface could also be integrated into the stand peripheral housing unit of the present invention.

The stand for a printer, USB port, and CD-ROM drive comprises the following components: right tower portion 200 and left tower portion 202 for holding a print head bracket 204; a print head bracket 204 for holding a printer; printer paper 206; a printer bay access door 120; a stand base 108 for housing a USB port for an external device and CD-ROM drive and a chute 109 for directing printer paper dispensed from the tower; a bottom EMI plate 216; a base door 114; a base board 212 with circuitry for controlling one or more peripherals; a USB adapter board 214 for an external USB device; a power board 210; and a top EMI plate 208.

The components of the stand base 108 are assembled as described below, although not necessarily in the order recited. The top EMI plate 208 is attached to the stand base 108 using fasteners and openings 228 on the EMI plate 208 and standoffs on the stand base 108. The power board 210 is placed below the top EMI plate 208. The base board 212 and USB adapter board 214 are then installed by attaching each component to the stand base 108 using fasteners and openings on the components 226, 215 and standoffs on the stand base 108. The base board may accommodate a peripheral such as a CD-ROM or DVD drive. Rubber feet 232 are attached to openings 222 on the bottom EMI plate 218 and the bottom EMI plate 218 is attached to the stand base 108 using opening 224 on the bottom EMI plate 218 and standoffs on the stand base 108. Power cords and/or cables (connectors) may then be inserted into ports on the base board 212. The base door 114 may then be attached to the stand base 108 using a thumbscrew 234 that is accommodated by a standoff on the stand base 108. The external connectors such as cords or cables may extend through an aperture at the back of the stand base 108 that is created when the base door 114 is attached to the stand base 108 or through an opening on the bottom of the stand base 108 that is created when a cutout portion of the base door 114 bottom is removed.

Figure 2B:
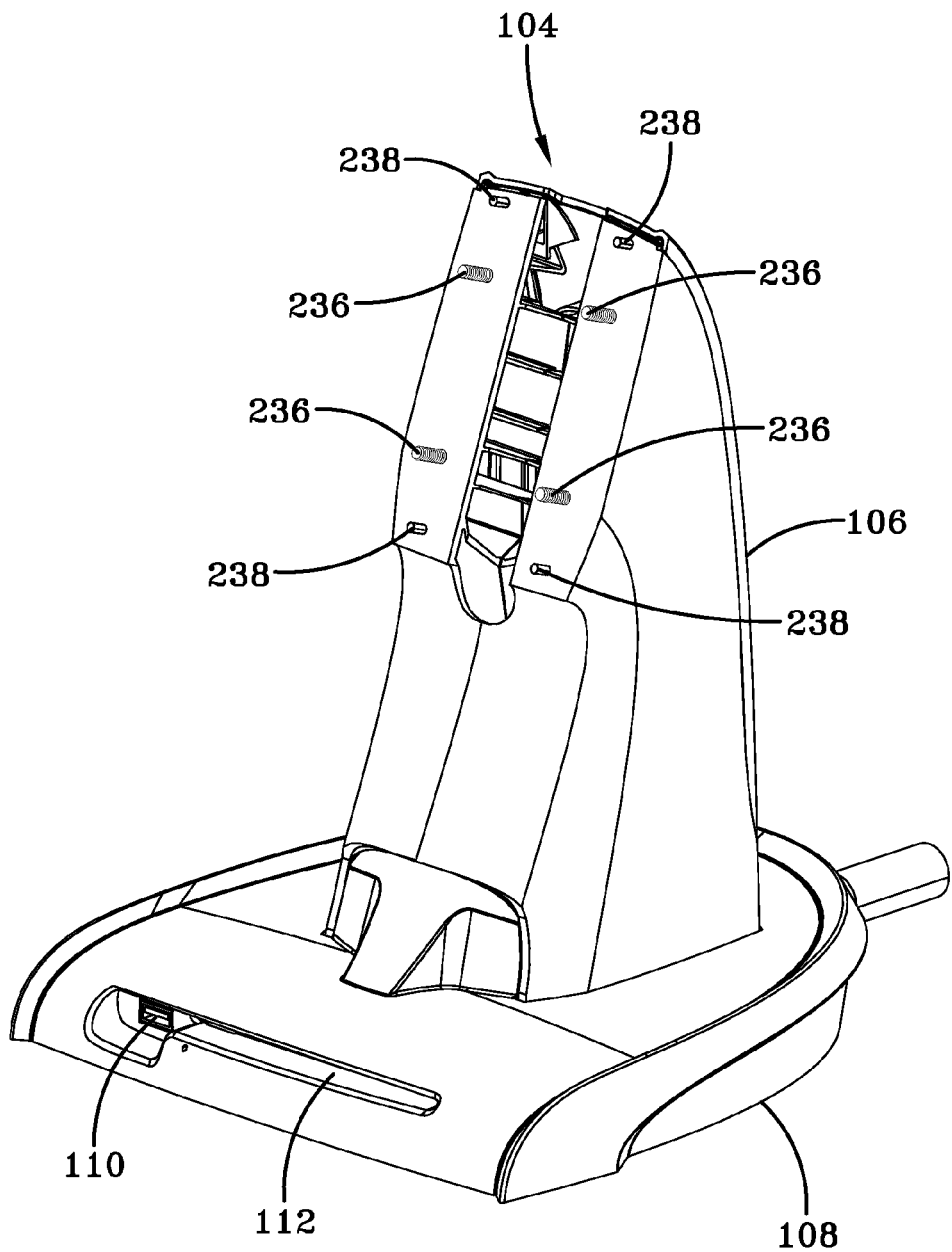
FIG. 2B is a front view of an assembled stand with integrated peripherals of an example embodiment of the present invention.

The components of the tower for housing the print head bracket 204 and printer paper 206 are assembled as described below, although not necessarily in the order recited. The print head bracket 204 is inserted between a left tower 200 and a right tower 202 that connect to form a housing for the print head bracket 204 and paper 206. The print head bracket 204 comprises means such as tabs or flanges for attaching each side of the bracket to a tower. The assembled tower then connects to the stand base 108 to form a complete or integrated stand 104 as shown in FIG. 2B. As shown in FIG. 2A, a printer bay access door 120 with clips or tabs 232 attaches to the back of the assembled tower to complete the unit and provide access to the printer and paper during operation. Multiple screws that are inserted through openings 230 in the left tower 200 and right tower 202 allow an integrated display computer to be attached to the complete or integrated stand 104. Guides 238 on each tower facilitate the process of attaching the integrated display computer.

Referring to FIG. 2B, a complete stand 104 which is ready to accommodate an integrated display computer comprises a stand base 108, a tower 106, guides 238 to facilitate the process of attaching an integrated display computer, and screws 236 for attaching the integrated display computer to the stand 104. Integrated display computers of various sizes may be attached to the stand and may be oriented in a landscape mode or a portrait mode.

Figure 3B:
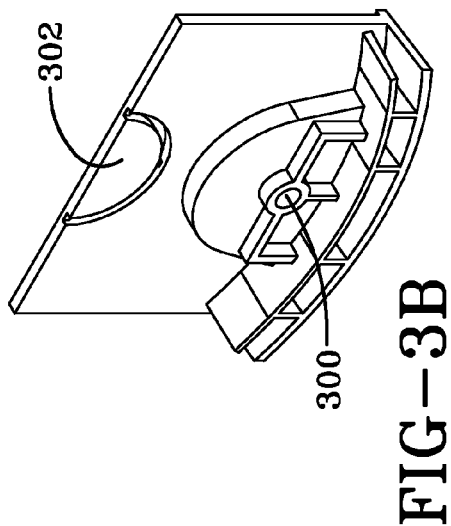
FIG. 3B is a perspective view.
Figure 3E:
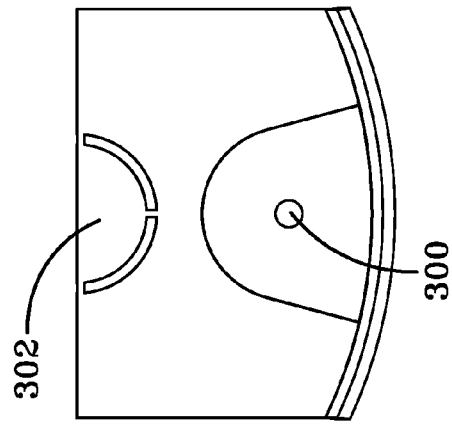
FIG. 3E is a bottom view of a base door as shown in FIG. 2A.
Figure 3D:
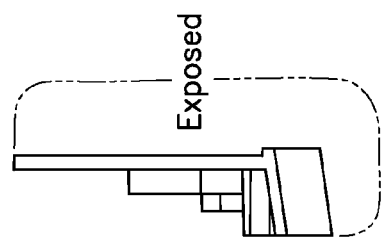
FIG. 3D is a side view.
Figure 3A:
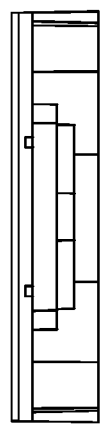
FIG. 3A is a front view.
Figure 3C:
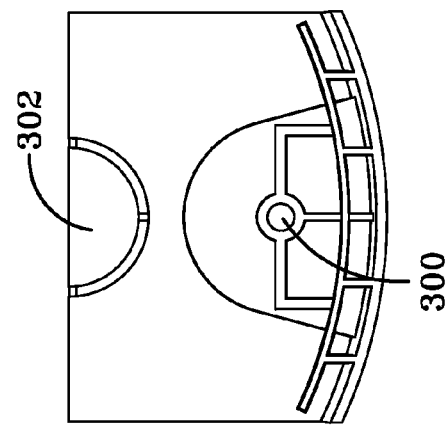
FIG. 3C is a top view.

Referring to FIGS. 3A-3E, various views of a base door of the stand shown in FIG. 2B can be seen. The base door provides a means for accommodating external connectors such as cords or cables that internal electronic componentry requires to operate. The base door comprises an opening 300 as shown in FIGS. 3B, 3C, and 3E to accommodate a thumbscrew for attaching the base door to the base stand. Referring again to FIG. 1A, the stand base 108 is designed to accommodate the base door 114 such that an aperture 116 through which external cords or cables may extend is created when the base door 114 is attached to the stand base 108. Referring to FIGS. 3B, 3C, and 3E, an opening in the base door may be created by removing a cutout portion 302. External cords or cables that attach to board ports inside the stand base may extend through the opening at the bottom of the base door. The base door and base stand may be designed so the inner compartment that is formed when the base door is attached to the base stand is sufficiently large to provide strain relief for any cords or cables that are plugged into the inside ports. FIG. 3D provides a view of the exposed area when the base door is attached to the stand base.

Figure 4B:
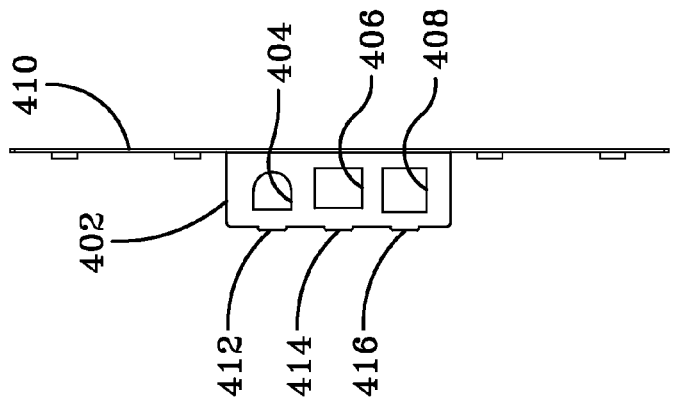
FIG. 4B is a front view.
Figure 4A:
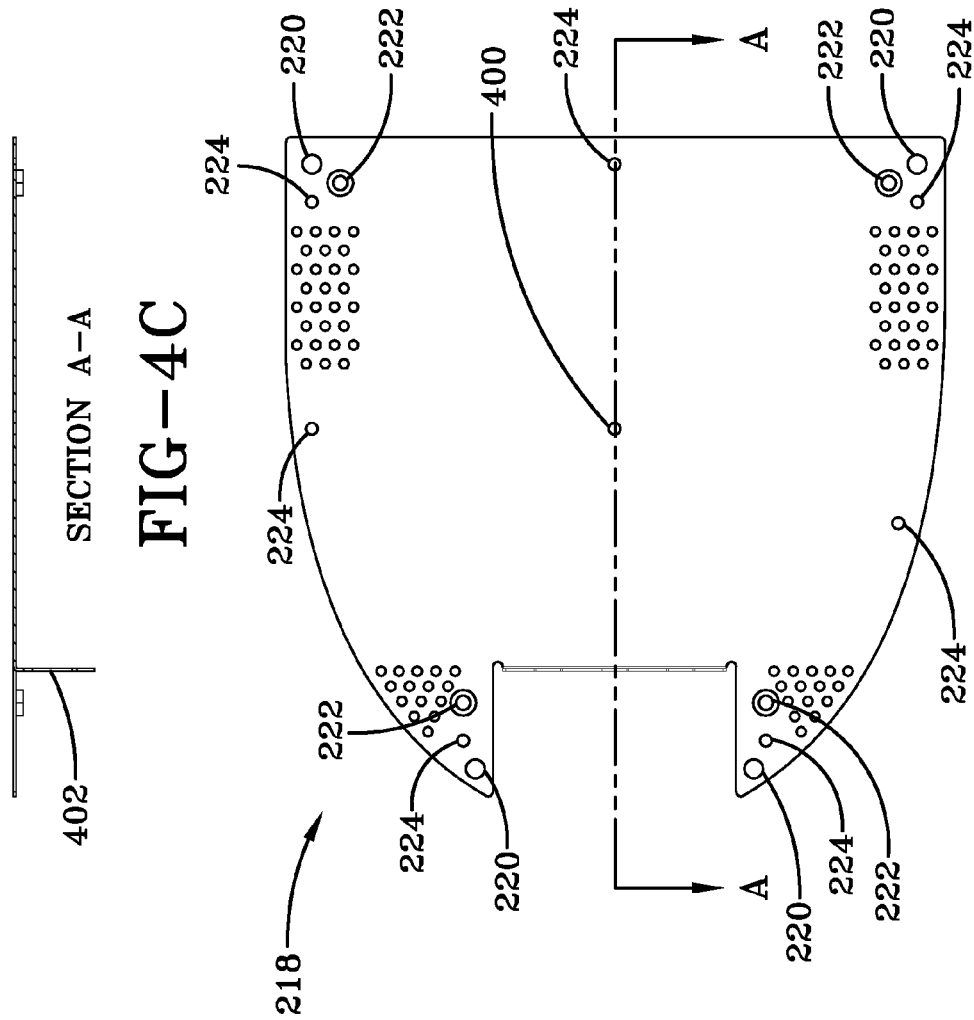
FIG. 4a is a bottom view.
Figure 4D:
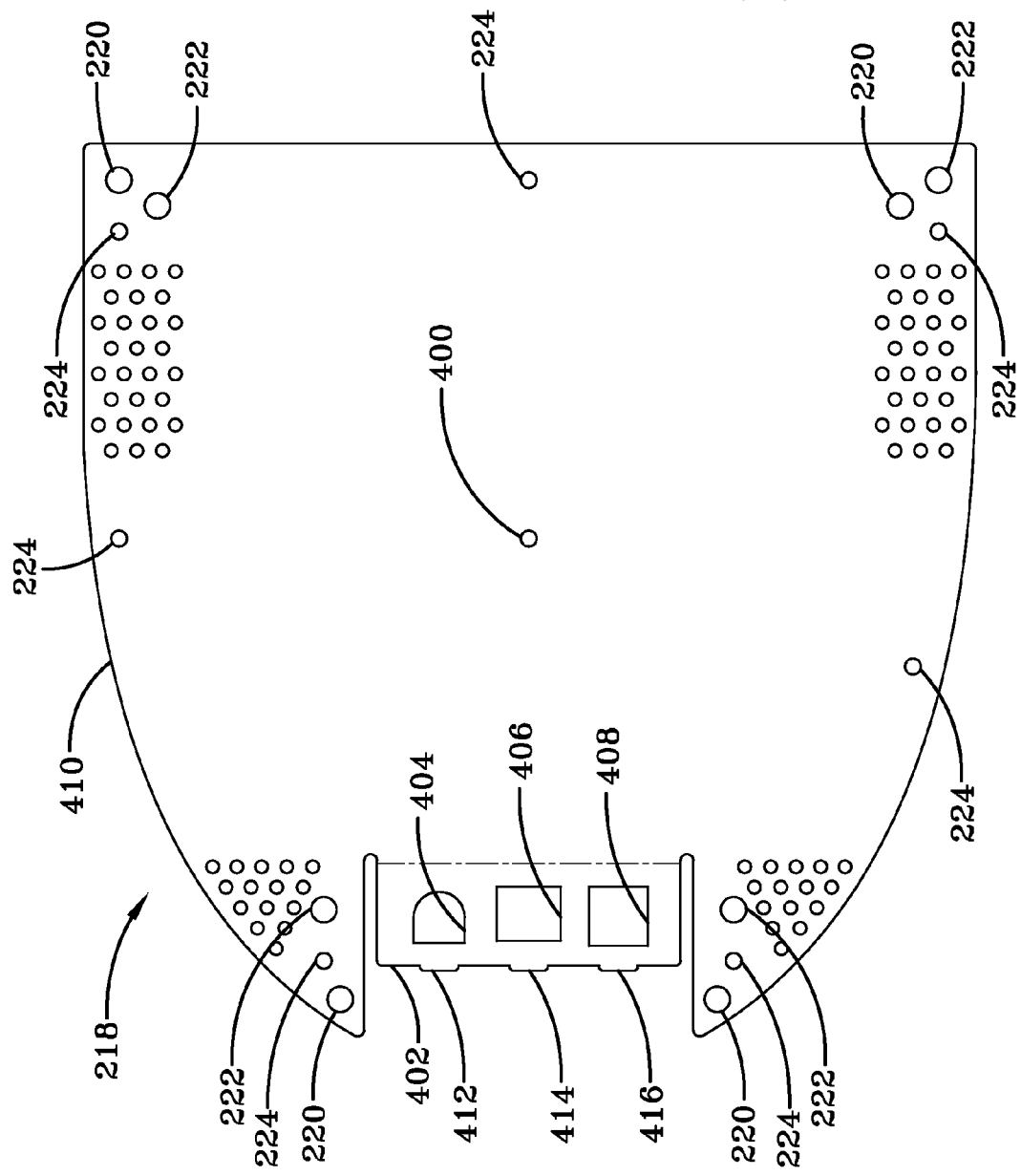
FIG. 4D is a top view of a bottom EMI plate as shown in FIG. 2A.

Various views of a bottom EMI plate of the assembly shown in FIG. 2A can be observed by reference to FIGS. 4A-4D. As shown in FIGS. 4A and 4D, the bottom EMI plate 218 comprises openings 222 for inserting rubber feet through the bottom. The bottom EMI plate 218 when attached to the stand base provides a bottom surface for the stand. Additional openings 224 are used to accommodate fasteners to attach the bottom EMI plate 218 to standoffs on the stand base. Another set of openings 220 may be used to attach the stand to a table top or other horizontal surface. Therefore, the entire unit may be secured to a table top or other surface to prevent movement of the unit while it is operational and to prevent theft. Finally, another opening in the middle 400 may be used to attach the unit to a pivot point to secure the unit to a surface but also allow the unit to be swiveled to facilitate access to the back.

As shown in FIGS. 4A-4C, the bottom EMI plate further comprises a tab 402 that is perpendicular to a plate 410 and with openings 404, 406, 408 to accommodate external cables or cords that are connected to the base board. For example, a first opening 404 may accommodate a power cord, a second opening 406 may accommodate a network connection, and a third opening 408 may accommodate a dual USB port. The inner compartment formed by the base door and stand base may be large enough to accommodate various USB devices such as devices to provide wireless networking features and functionality. Notches 412, 414, 416 at the top of the tab 402 align with corresponding slots on the top EMI plate. The notches and slots facilitate alignment of the various components that are installed in the stand base to provide the peripheral features and functionality. FIG. 4D, which shows a tab 402 prior to a bending operation, further illustrates details regarding the features of the bottom EMI plate.

Figure 5:
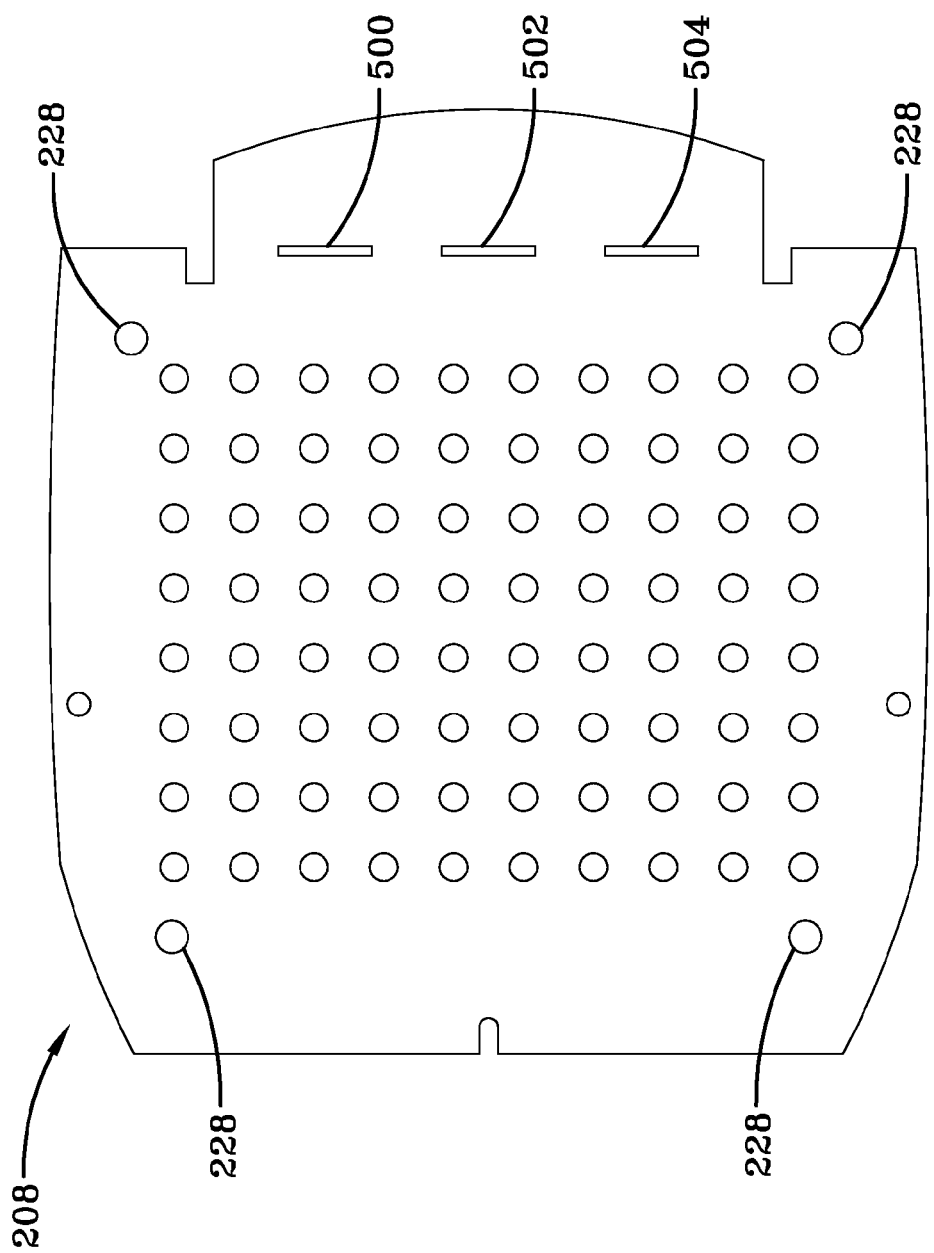
FIG. 5 is a top view of a top EMI plate as shown in FIG. 2A.

Referring to FIG. 5, a top EMI plate for the assembly shown in FIG. 2A can be seen. The top EMI plate 208 comprises openings 228 so that the top EMI plate can be attached with fasteners to standoffs in the stand base. The top EMI plate 208 further comprises slots 500, 502, 504 to accommodate corresponding notches on the bottom EMI plate. The notches and slots facilitate alignment of the various components that are installed in the stand base to provide the peripheral features and functionality.

Referring to FIGS. 6A-6D, various views of the stand base shown in FIG. 2A can be seen. The stand base houses one or more peripherals such as a CD-ROM or DVD drive and USB port. It further comprises a chute 109 for directing printer paper dispensed from the tower. As indicated in FIG. 6B, various standoffs are provided to accommodate fasteners that are used to attach the EMI plates, base board, and base door to the stand base. Standoff 604 accommodates the thumb screw for the base door.

Additional standoffs 606, 608, 610, 612, 614, 616, 618, 620 accommodate other components. As indicated in FIG. 6C, only the portions of the peripherals with which the user interacts are exposed after the stand base is assembled. The front portion of the stand 622 as shown in FIG. 6D may be modified with openings or cutouts to allow user access to peripherals housed in the stand. Finally, referring to FIG. 6A, an opening 624 in the top of the stand base 108 allows a peripheral in the tower to connect to the power board and/or base board housed in the stand base 108 using an internal connector.

Figure 7A:
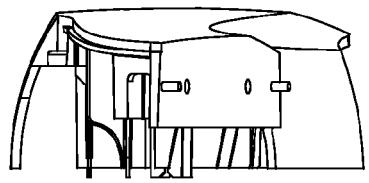
FIG. 7A is a top view.
Figure 7B:
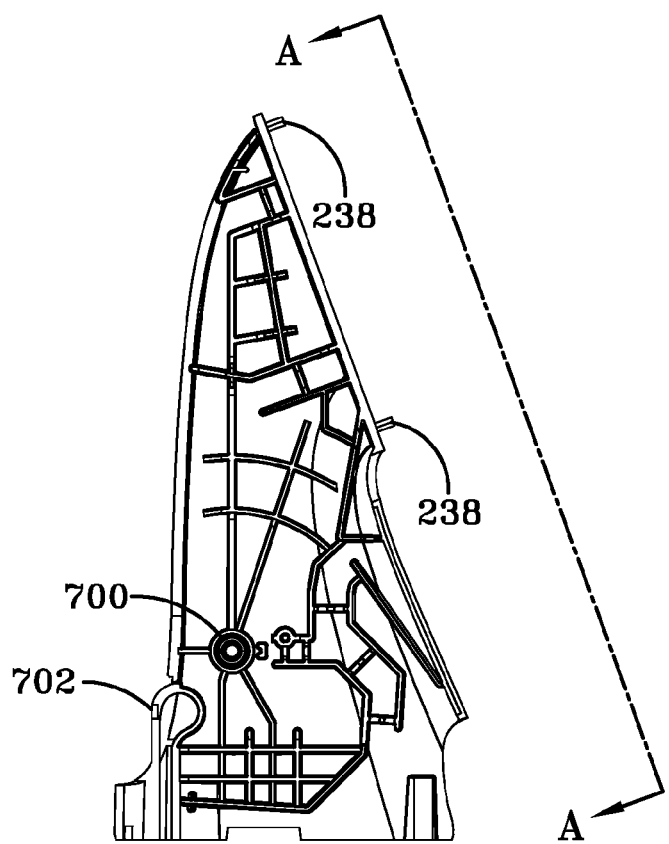
FIG. 7B is a side view.
Figure 7C:
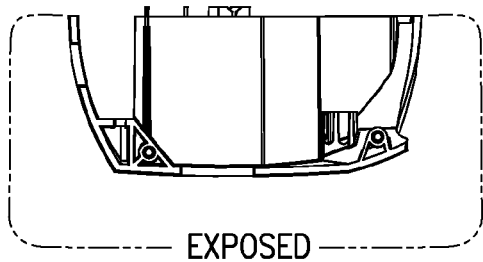
FIG. 7C is a view of the exposed area, 7D is an orthogonal view.
Figure 7D:
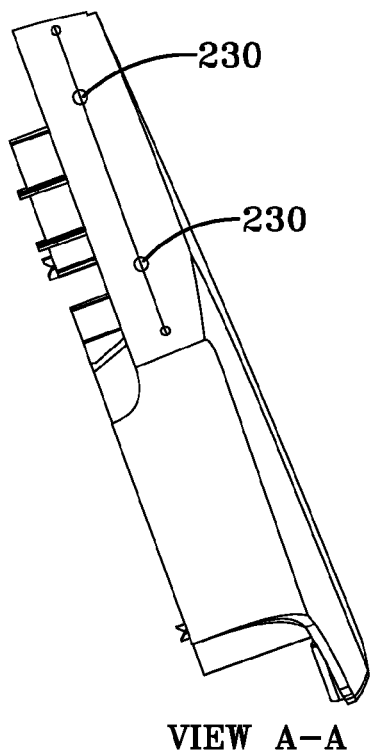
FIG. 7E is a perspective view of a right tower as shown in FIG. 2A.
Figure 7E:
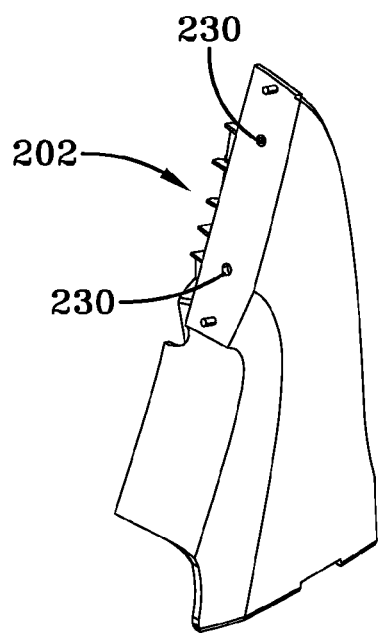

Various views of a right tower portion of the assembly of FIG. 2A are shown in FIGS. 7A-7E. The right tower portion 202 comprises a boss 700 to accept a fastener that is used to attach the print head bracket to the tower. A rounded channel 702 serves as a guide for tabs on the printer bay access door so that it may be opened, but not removed easily, to provide access to the printer and paper. The tower portion 202 further comprises guides 238 as shown in FIG. 7B to facilitate the alignment of an integrated display computer on the assembled tower and openings 230 as shown in FIG. 7D to accept screws that are used to attach the integrated display computer to the assembled tower.

Figure 8A:
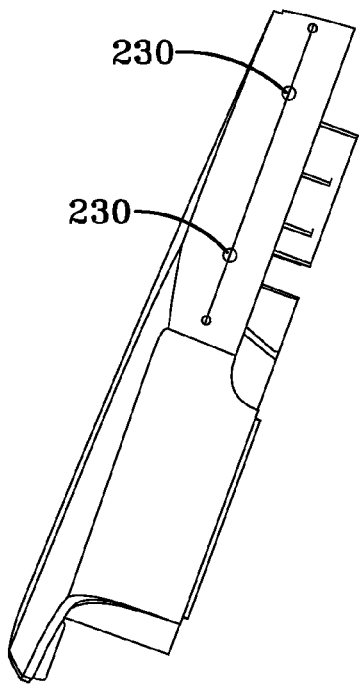
FIG. 8A is an orthogonal view.
Figure 8B:
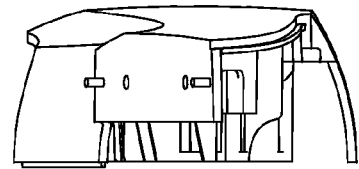
FIG. 8B is a top view.
Figure 8C:
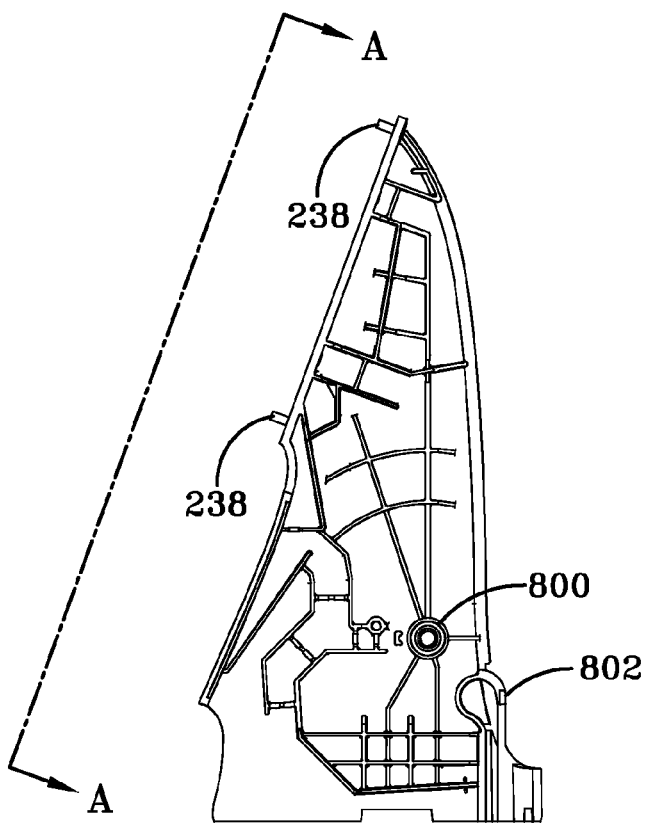
FIG. 8C is a side view, 8D is a view of the exposed area.
Figure 8E:
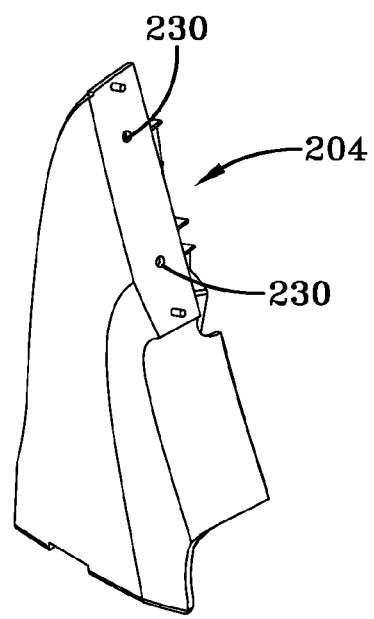
FIG. 8E is a perspective view of a left tower as shown in FIG. 2A.
Figure 8D:
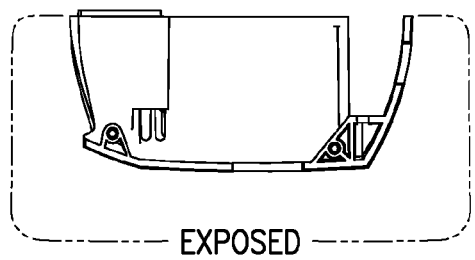

Various views of a left tower portion of the assembly of FIG. 2A are shown in FIGS. 8A-8E. The left tower portion 200 comprises a boss 800 to accept a fastener that is used to attach the print head bracket to the tower. A rounded channel 802 serves as a guide for a tab on the printer bay access door so that it may be opened, but not removed easily, to provide access to the printer and paper. The tower portion 200 further comprises guides 238 as shown in FIG. 8B to facilitate the alignment of an integrated display computer on the assembled tower and openings 230 as shown in FIG. 8D to accept screws that are used to attach the integrated display computer to the assembled tower. The assembled tower then holds the integrated display computer.

Figure 9B:
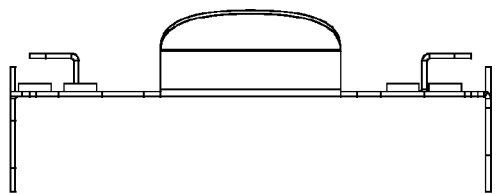
FIG. 9B is a top view, 9D is a front view.
Figure 9C:
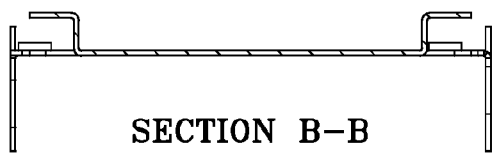
FIGS. 9A and 9C are sectional views.
Figures 9A, 9D:
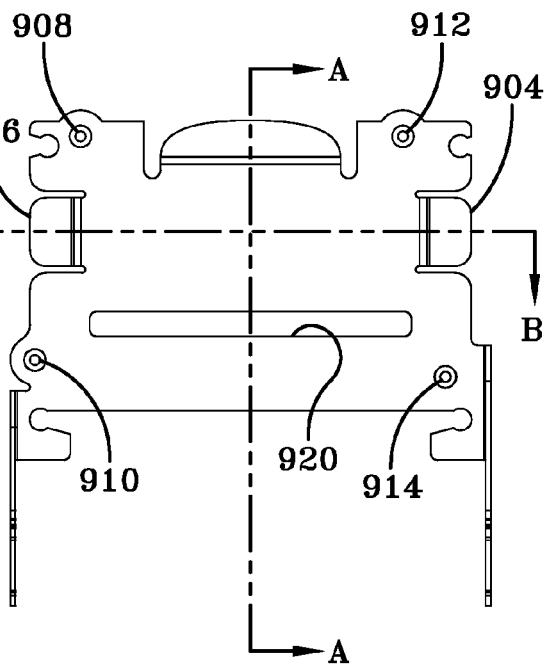
Figure 9E:
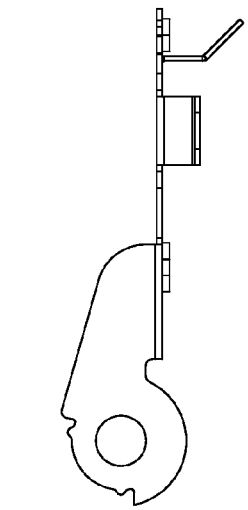
FIG. 9E is a right side view.

FIGS. 9A-9G are various views of a print head bracket for the assembly of FIG. 2A. Referring to FIG. 9F, the print head bracket 204 comprises tabs 900, 902 on either side with openings 916, 918 so that the bracket may be attached using fasteners to bosses on the right and left tower portions. The tower accommodates additional tabs 904, 906 that are used to align and secure the print head bracket within the assembled tower. Openings 908, 910, 912, 914 accommodate fasteners for attaching a printer to the print head bracket. A slot 920 in the print head bracket accommodates paper that is dispensed through an aperture between the assembled tower and the chute on the stand base. The aperture is created when the tower and stand base are attached. Paper for the printer is installed on a floor that is formed when the left and right towers are assembled to form a complete unit. The paper rests on the floor and is fed through the printer so that receipts or other information may be printed and dispensed from the tower. The printer may be connected to the power board and the base board through one or more openings on the top of the stand base. One or more internal connectors may be used to connect the components.

Referring to FIGS. 10A-10F, various views of a printer bay access door for the assembly of FIG. 2A are shown. Referring to FIG. 10B, the printer bay access door 232 can be seen to include clips or tabs 234 for attaching the printer bay access door to the stand. The printer bay access door provides easy access to the printer so that the printer can be serviced and to the tower floor so that empty paper spools may be removed and new rolls of paper installed. The clips or tabs 232 align with rounded channels in the right and left towers so that the printer bay access door may be opened, but not removed, easily. Pivot points on the clips or tabs 232 allow the door to lay flat when opened but not detached completely. A handle 1000 in the door makes it easy to lift the door and guide it through the channels so that it lays flat and the printer or paper in the tower is easily accessed.

The enclosed peripherals provide extra functionality for the integrated display computer. As should be apparent from the figures, the tower and stand base of the present invention may house various peripherals to increase the features and functionality of the integrated display unit. Although the present invention has been explained in accordance with an example embodiment of the present invention wherein a printer is enclosed in a tower housing unit and a CD-ROM or DVD drive and USB port are enclosed in a stand base housing unit, the tower and stand base may be modified to accommodate other types of peripherals such as magnetic card readers and bar code scanners. The stand further accommodates various sizes of integrated display computers which may be attached in a landscape mode or a portrait mode. The modularity of the stand and integrated display computer which attaches to the stand allows the components to be configured in many different ways and therefore, adapted for many different uses.

In an example embodiment of the present invention, the peripherals that are contained in the tower and stand housing units are peripherals that pass FCC testing (EMI) and UL standards as stand-alone peripherals. Many personal computer USB peripherals that could be contained in the stand are stand-alone peripherals that meet such requirements. A ground path through housing unit and associated metal bracketry provides static discharge so that once attached, the stand peripheral housing unit and integrated display computer, which also meets FCC (EMI) and UL requirements, form a single unit that meets the applicable requirements.

The ability to incorporate various peripherals into a stand for an integrated display computer allows the complete unit to be configured for many applications. Such applications include use in retail stores, advertising and informational promotions, schools, libraries, and hospitals. The completed units are also suitable for use in many different settings including high-traffic settings. The peripherals are well-protected and securely incorporated into the unit. Therefore, they are unlikely to be disturbed or detached during normal operation. Furthermore, the completed unit may be attached to a surface and optionally locked to a permanent object using a cable lock. The units, therefore, are unlikely to be removed from their locations. Finally, the stand may be adapted for integrated display computers of many sizes and different orientations. Any limitations on size may be dictated by the size of actual peripheral device rather than the other components comprising the housing of the peripherals for the stand.

Integrated display computers with integrated peripherals and a stand with integrated peripherals according to the present invention provide substantial functionality in an attractive package. While example embodiments of the invention have been illustrated and described, various modifications and combinations can be made without departing from the spirit and scope of the invention. Many types of peripheral devices may be integrated into a stand according to the apparatus and method of the present invention and still fall within the scope of the present invention. The configuration of a stand according to the present invention may be varied in many ways and still fall within the scope of the present invention. Modifications, combinations, and equivalents to the apparatus and method of the present invention are intended to be covered and claimed.

What is claimed is:

1. A stand for housing peripheral devices for an integrated display computer comprising:
    (a) a base board comprising circuitry for controlling a peripheral device and at least one internal port for receiving an internal connector to a processor on said integrated display computer to support interactions between said processor of said integrated display computer and said peripheral;
    (b) a stand base for housing said base board, wherein said stand base comprises:
        (i) attachment means for accepting fasteners for attaching said base board to said stand base;
        (ii) external connector accommodation means for allowing external connectors to be connected to said base board in said stand base;
    (c) a stand tower for holding said integrated display computer wherein said stand tower comprises:
        (i) attachment means for attaching said integrated display computer to said stand tower;
        (ii) a compartment for accommodating said internal connector between said processor of said integrated display computer and said base board
    (d) wherein said stand base and said stand tower are coupled to form a complete stand for housing said peripheral device and for holding said integrated display computer attached to said stand tower;
    wherein said stand tower is adapted to house a second peripheral device; and wherein said second peripheral device is a printer.

2. The stand of claim 1 wherein said stand base is adapted to house a peripheral device selected from the group consisting of USB ports, digital media card readers, bar code scanners, magnetic card readers, CD-ROM drives, and DVD drives.

3. The stand of claim 1 further comprising at least one peripheral device in said stand base.

4. The stand of claim 1 wherein said external connector accommodation means for allowing external connectors to be connected to said base board in said stand base is a base door.

5. The stand of claim 4 further comprising an aperture formed when said base door is installed in said stand wherein said aperture allows external connectors to be connected to said base board.

6. The stand of claim 4 wherein said base door comprises a cutout for allowing external connectors to be attached to said base board.

7. The stand of claim 1 wherein said integrated computer display is a fanless integrated display computer.

8. A stand for housing peripheral devices for an integrated display computer comprising:
    (a) a stand base for housing a base board, wherein said stand base comprises:
        (i) attachment means for accepting fasteners for attaching said base board to said stand base;
        (ii) external connector accommodation means for allowing external connectors to be connected to said base board in said stand base; and
        (iii) wherein said base board comprises at least one internal port for receiving an internal connector to a processor on said integrated display computer to support interactions between said processor of said integrated display computer and a peripheral device;
    (b) a stand tower for housing said peripheral device, wherein said stand tower comprises a right tower portion and a left tower portion for holding said peripheral device and accommodating said internal connector between said processor of said integrated display computer and said base board and comprises attachment means for attaching said integrated computer display to said stand tower;
    (e) wherein said stand base and said stand tower are coupled to form a complete stand for housing said peripheral device such that said internal connector connects to said base board in said stand base and to said processor of said integrated display computer, for holding said integrated computer display attached to said stand tower, and for accommodating cables attached to said base board;
    wherein said stand base is adapted to house a second peripheral device; and wherein said stand tower is adapted to house a printer.

9. The stand of claim 8 wherein said second peripheral device is selected from the group consisting of USB ports, digital media card readers, bar code scanners, magnetic card readers, CD-ROM drives, and DVD drives.

10. The stand of claim 8 further comprising at least one peripheral device in said stand tower.

11. The stand of claim 8 wherein said cable accommodation means for allowing external connectors to be attached to said base board in said stand base is a base door.

12. The stand of claim 11 further comprising an aperture formed when said base door is installed in said stand for allowing external connectors to be attached to said base board.

13. The stand of claim 11 wherein said base door comprises a cutout for allowing external connectors to be attached to said base board.

14. The stand of claim 8 wherein said integrated computer display is a fanless integrated display computer.

* * * * *

UNITED STATES PATENT AND TRADEMARK OFFICE
CERTIFICATE OF CORRECTION

PATENT NO.        : 7,433,185 B1  
APPLICATION NO. : 11/267490  
DATED              : October 7, 2008  
INVENTOR(S)       : Curran et al.

Page 1 of 1

It is certified that error appears in the above-identified patent and that said Letters Patent is hereby corrected as shown below:

In column 5, line 12, please delete "216" and insert -- 218 --; and

In column 5, line 26, please delete "232" and insert -- 221 --.

Signed and Sealed this

Eighteenth Day of November, 2008

JON W. DUDAS  
*Director of the United States Patent and Trademark Office*